No. 618,585. Patented Jan. 31, 1899.
N. ROSENBERG.
TOOL FOR CUTTING SQUARE HOLES.
(Application filed Feb. 28, 1898.)
(No Model.)
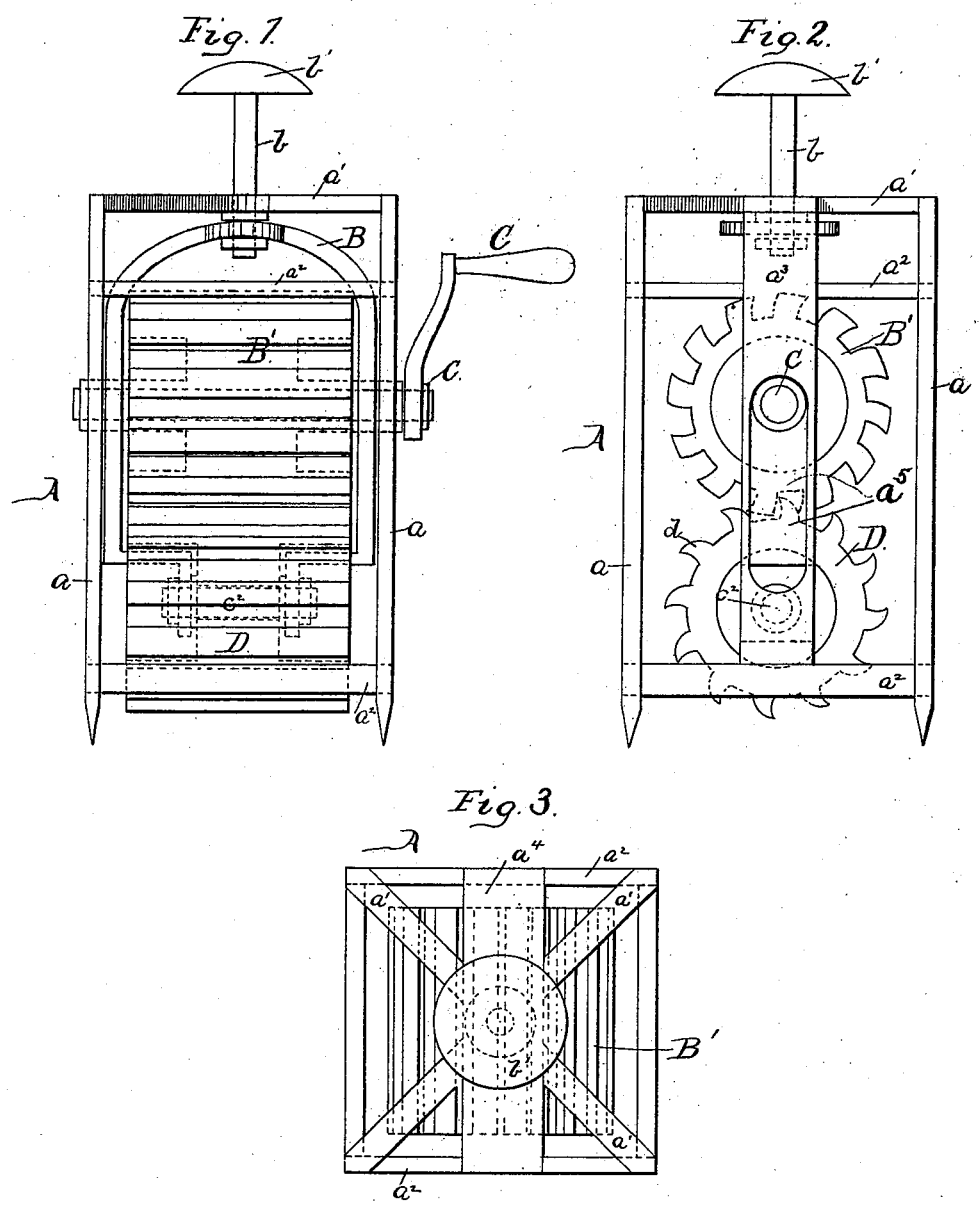

UNITED STATES PATENT OFFICE.

NATHAN ROSENBERG, OF NEW YORK, N. Y.

TOOL FOR CUTTING SQUARE HOLES.

SPECIFICATION forming part of Letters Patent No. 618,585, dated January 31, 1899.

Application filed February 28, 1898. Serial No. 671,950. (No model.)

*To all whom it may concern:*

Be it known that I, NATHAN ROSENBERG, a citizen of the United States, residing at New York, (Brooklyn,) in the county of Kings and State of New York, have invented certain new and useful Improvements in Tools for Cutting Square Holes, of which the following is a full and complete specification, such as will enable those skilled in the art to which it appertains to make and use the same.

This invention relates to a tool or device which is designed to cut square holes; and the object is to provide a tool of this class which is simple in construction, effective in operation, and which is economical to manufacture.

The invention consists of a tool or device to cut square holes constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1 is a front view of the improved tool for cutting square holes. Fig. 2 is a side view thereof, and Fig. 3 is a top view.

Referring to the drawings, A represents a frame which comprises four corner-posts $a$, connected at their upper ends by cross-bars $a'$ and at a point below the upper ends by top and bottom braces $a^2$. Suitable side braces $a^3$ extend from the bottom braces $a^2$ upwardly to the top of the frame, where they are united by a top brace $a^4$. A longitudinal slot $a^5$ is arranged in the side braces $a^3$ to provide for the vertical adjustment of the shaft C.

A yoke-shaped carrier B is arranged within the frame A and is supported at its upper end by a threaded bolt $b$, which is threaded in a perforation formed at the meeting-point of the bars and braces above described. A simple means of attachment is shown in Fig. 1, which comprises a nut threaded upon the bolt $b$, above and below the carrier B. A shaft C is journaled in the upper portion of the carrier B and extends through the side braces $a^3$ and is provided with a suitable crank-handle C', as shown in Fig. 1. A suitable gear-wheel B' is fixed upon the shaft C and rotates within the carrier B. The lower ends of the yoke-frame forming the carrier B are bent inwardly toward each other and then downwardly and form bearings for the shaft $C^2$, upon which is fixed the cutter-wheel D, which is provided with cutting teeth or blades $d$, the backs of the blades being adapted to be engaged by the teeth of the gear-wheel B'.

The tool or device is placed over the point where it is desired to bore a square hole. Pressure is applied to the enlarged head $b'$ of the bolt $b$, which forces the cutter-blades down into contact with the material to be cut. The crank-handle is then rotated, causing the rotation of the gear-wheel, by which the cutter-wheel is rotated and the work of cutting accomplished.

In order to bore a polygonal hole, it is only necessary to shift the position of the frame in an obvious manner.

As shown in the drawings, the cutter-wheel is so proportioned as to cut a square hole—that is to say, the length of the cutter-wheel is equal to the diameter thereof. While these proportions are preferred, it will be understood that they are not essential, as it is within the scope of my invention to so adjust the proportions of the cutter-wheel as to cut a rectangular hole of any desired length and breadth within the limits of the device.

Having fully described my invention, I claim as new and desire to secure by Letters Patent—

1. In a tool or device for cutting square holes, the combination with a frame having slotted side braces, of a yoke-frame adjustably mounted in said frame, a shaft journaled in said yoke, the ends of said shaft projecting through said slotted braces, a crank-handle fixed upon the end of said shaft, a gear-wheel fixed on said shaft, a shaft journaled in the lower portion of said yoke, a cutter-wheel fixed upon said lower shaft, cutter-blades upon said cutter-wheel and adapted to be engaged by the teeth of the gear-wheel, and means for vertically adjusting the said yoke-frame, substantially as described.

2. In a tool or device for cutting square holes, the combination with a suitable frame having slotted side braces, of a yoke-shaped frame, a threaded bolt adjustably connecting said yoke with the upper part of the frame, an upper and a lower shaft journaled in said yoke, the upper shaft projecting through the slots in said side braces, a crank-handle secured upon said shaft, a gear-wheel fixed upon the upper shaft, a cutter-wheel fixed upon the lower shaft, and cutter-blades arranged upon said cutter-wheel the backs of which are adapted to be engaged by the teeth of said gear-wheel, substantially as described.

3. A tool for the purpose herein described, comprising a suitable frame, a vertically-movable carrier mounted therein, a shaft mounted in said carrier and provided with a crank, a gear-wheel mounted on said shaft, and a cutter-wheel mounted in said carrier below said gear-wheel and adapted to be engaged by and operated thereby, substantially as shown and described.

4. A tool for the purpose herein described, comprising a suitable frame, a main shaft mounted therein, a wheel mounted on said main shaft, a cutter-wheel journaled in said frame below said main shaft, and provided with cutting-blades which are adapted to be engaged by the wheel on the main shaft, and means for operating the main shaft, said cutter-wheel and main shaft being vertically adjustable, substantially as shown and described.

In testimony that I claim the foregoing as my invention I have signed my name, in presence of the subscribing witnesses, this 25th day of February, 1898.

NATHAN ROSENBERG.

Witnesses:
L. M. MULLER,
M. A. KNOWLES.